Figure 1:
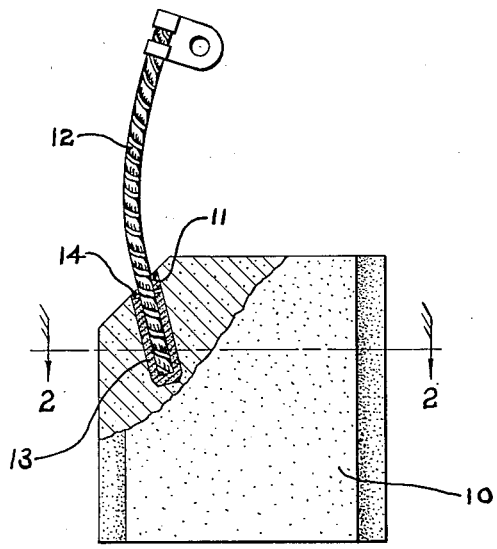

March 10, 1953     J. B. FALCETTONI     2,631,252

CONNECTION FOR CARBON BRUSHES

Filed March 30, 1950

INVENTOR.
JOHN B. FALCETTONI
BY
HIS ATTORNEY

Patented Mar. 10, 1953

2,631,252

UNITED STATES PATENT OFFICE 2,631,252

CONNECTION FOR CARBON BRUSHES

John B. Falcettoni, Kersey, Pa., assignor to Speer Carbon Company, St. Mary's, Pa., a corporation of Pennsylvania Application March 30, 1950, Serial No. 152,894

14 Claims. (Cl. 310—249)

This invention relates to connection for carbon brushes and the like; and it relates more particularly to the combination, with an electrically conductive block of carbonaceous material, of a flexible conductor terminally anchored thereto by a tamped metal powder connection comprising, essentially, copper powder that has been coated, prior to use, with some other metal, more particularly silver, the tamped connection being most desirably protected by suitable sealing material.

The invention finds its greatest present practical utility in the field of electrical brushes adapted for use in electric motors or generators, composed of carbon, graphite, metal graphite, or the like (herein generically termed "carbon") and provided with flexible copper conductors or leads, such as those of the stranded copper wire cable or pigtail type, terminally secured thereto by embedment in the brush body, whereby such a brush may be connected in an electrical circuit. In hereinafter explaining the nature of the present invention, therefore, reference will be made more particularly to an electrical brush as a typical illustrative embodiment thereof, but it will be understood that the invention has practical application in other fields also as, for example, in manufacturing battery electrodes.

The use in such tamped connections of powdered or granulated metals, in particular powdered spongy copper produced by the reduction of copper oxide, was first proposed more than forty years ago (McCourt Patent No. 904,077). In an effort to improve this general type of connection in one respect or another, various modifications of it have appeared from time to time in later patents. One is the use of a powdered copper amalgam (Eynon Patent No. 1,188,635) as the tamping material. Another proposal involves tamping a mixture of powdered copper and some lower melting metal in powder form, such as tin or lead, into the hole in the brush body around the inserted end portion of the flexible conductor, and then heating the assemblage to a temperature sufficiently high to fuse the lower melting metal and unite the particles of powdered copper into an integral mass which, in turn, is also in fused metal union with the conductor, thus providing a kind of soldered junction of the conductor to the body of the brush (Adams et al. 1,770,825, Eynon 1,885,903). Although these and other prior proposals for improving upon the original simple tamped copper powder connection have aimed at increasing its electrical conductivity and rendering it mechanically stronger and more resistant to pulling out, it is well known that there has thus far been only partial success, at the most, in attaining these objectives.

Thus, in the case of the mercury-copper amalgam tamped connection, which has been employed extensively in commercial practice heretofore because of relative ease of manufacture and reasonably satisfactory performance under moderate current loads, present day current requirements often cause excessive heating of the connection to occur, resulting in shrinkage of the pigtail-anchoring slug of amalgam, with consequent increase in resistance. This causes more heating, with further shrinkage and rise in resistance, and so on in cycle, until the connection fails from burning of the wire pigtail. The slug of amalgam may even shrink so much as to be free to fall out of the brush body.

As regards the soldered type of connection referred to hereinabove, not only is this type more expensive to produce because of the additional step of heating required after the tamping operation, but its electrical resistance is higher than is desirable and hence, also, its tendency to overheat excessively.

It is an object of the present invention, to provide a novel tamped connection for carbon brushes and the like possessing improved characteristics that render it superior, both electrically and mechanically, to any tamped connection heretofore available, so far as this applicant is aware. Said object is achieved, in accordance with the principles of the invention, by employing as tamping material finely divided copper of which the particles or granules have been previously provided with an adherent protective coating of another metal, said material being in fluent pulverulent or granular condition and capable, under pressure, of consolidating or compacting into a coherent mass. This granular mass, of which the component coated copper particles or granules, when firmly compacted by the customary tamping operation nevertheless remain discrete, that is, not integrally united as by fusion of the coating metal or otherwise, provides a metal conductor connection or anchorage in a carbon brush that has noteworthy points of superiority.

For various reasons presently to be pointed out, silver is employed as the coating metal in what is now regarded as the best mode of practicing the invention. The use of silver with copper in a tamping powder is believed to be broadly new. However, the benefits of the invention can be realized in substantial albeit materially less degree when the copper particles are coated with any of several other metals, including tin, cadmium, zinc, lead and nickel, the use of some of which in a tamping powder, to act as solders upon baking the tamped connection, has been heretofore proposed. It is to be understood, therefore, that in its broader aspects the invention does not exclude use of such other metals as coating material; for, although they are by no means to be regarded as equivalents of silver, use of them as contemplated by the present invention gives superior results as compared to those realized when they are used as solders.

In the novel connection of the present invention, the coating metal performs with maximum effectiveness its primary function of protecting the underlying copper body or core of each bimetallic granule from oxidation and other deterioration commonly undergone by brush connections heretofore known as a result of high temperature brush operation. At the same time the conductivity is superior to that of comparable previously known connections, thus reducing the tendency of the brush to overheat when operating under heavy current load.

By properly selecting the method to be employed in pre-coating the copper particles with whatever second metal is employed, a relatively uniform coating that is very thin, yet adequately protective, is readily obtainable. Depositing the second metal upon the copper powder by chemical displacement, as in a simple immersion or contact plating operation, is one practical and effective way of accomplishing this and is ordinarily to be recommended.

It is obvious, however, that other methods (e. g. electroplating, sherardizing, cementation, etc.) may be employed for providing each particle of the powdered or granular copper with the desired substantially uniform thin coating of the second metal. In any case, the coating operation should be so conducted as to yield a tamping powder in which the coated copper particles, which are usually of slightly larger size than the uncoated copper particles, remain wholly or mainly distinct physical and non-cohering, so that the material is granular and free-flowing until compacted into a coherent body under the tamping pressure employed.

One of the important advantages flowing from the use of such a tamping powder is that since only a relatively thin coating of the second metal (or alloy) is needed to provide the desired protection of the underlying copper, and since the thickness of such coating can be rather accurately controlled in the operation of pre-coating the loose copper powder, it becomes possible to restrict the proportion of second metal in the tamping powder and in the finished tamped brush connection to a relatively low practical minimum. Where silver is the second metal, adherence to such minimum proportion is usually desirable from the standpoint of economy in view of the relatively high cost of silver. However, the superior characteristics of the resultant brush connection, including lowered contact resistance and consequent longer service life, would justify incurring substantially greater cost of coating material than use of the permissible minimum percentage of silver entails. In actual practice, it is found that for best results the silver coating should ordinarily amount to at least 1.5 per cent by weight of the coated copper powder, although a coating amounting to as little as 0.1 per cent has a noticeably favorable effect and is therefore within the scope of the invention. Use of a heavier coating of silver than is necessary to give the desired degree of protection of the copper base from oxidation further reduces somewhat the contact resistance of the brush connection, both because of the slightly higher conductivity of silver as compared to copper and also because of the relatively low contact resistance of silver oxide and silver sulphide. Such thicker coating also doubtless gives somewhat greater protection of the copper against oxidation. However, the gains in both these respects afforded by a silver coating as its weight increases beyond about 2 per cent of the total weight of the coated copper are by no means proportional to the weight increase, and their practical value is thus rapidly overbalanced by increasing cost. As a general rule, therefore, it is only very rarely that a silver coating as heavy as 3 per cent of the plated copper powder is found to be warranted economically, and more commonly the requirements can be satisfactorily met with a silver coating of 2 per cent or less. A 5 per cent silver coating would appear usually to be an extreme upper limit for economic practicability, although heavier coatings are, of course, not excluded and in some cases may be warranted.

When for any reason it appears necessary or desirable to use as the coating metal, instead of silver, one of the other metals mentioned hereinabove, the electrical conductivities of all of which are much lower than that of copper, it is possible by virtue of the present invention to employ only a fraction of the quantity of such other metal that would be required under prior practice for protection of the underlying copper, thereby minimizing the increase in resistance unavoidably entailed when using such other metal, and improving materially the performance characteristics of the brush connection as compared to those of previously known connections of this type. Thus, where tin (electrical conductivity one-tenth that of copper) is to be employed as the coating metal in accordance with the invention, not more than 5 per cent is required at the most, based on the weight of the copper, and ordinarily a much lower percentage will suffice. This contrasts with such prior practice as that represented by the above-mentioned patents to Adams et al. 1,770,825 and Eynon 1,885,903, which recommend using powdered tin in the proportions of 25 per cent and 67 per cent, respectively, of the copper powder in producing the "soldered" type of brush connection they disclose.

Granular spongy copper produced by reducing copper oxide has been generally recognized from the first as a particularly desirable form of finely divided copper to employ in tamping powder for anchoring a conductor in a carbon brush or the like. This is because the peculiar physical characteristics of the component granules of such spongy copper are such that it does not require excessive pressure to consolidate it properly into a coherent mass encasing the end portion of the conductor and anchoring it in the brush body. Among these characteristics are great porosity, surface roughness, irregular shape and non-uniform size of the individual particles or granules. Depositing upon such copper "powder" the relatively thin coating of silver or other second metal herein contemplated does not materially alter the physical characteristics aforesaid nor in any way affect adversely the desirable properties of granular spongy copper as a tamping powder.

In a typical example illustrating good practice within the invention but not to be construed as in any way limiting its scope, a spongy copper powder produced by Metals Disintegrating Company, Inc., Elizabeth, New Jersey, and commercially available under the grade mark MD8841, may desirably constitute the copper component of the bimetallic tamping powder. This copper powder, produced by reduction of copper oxide, is non-uniform in particle size but in large part relatively coarse, 100 per cent being retained on a No. 150 sieve and 100 per cent just passing a No. 28 sieve, U. S. Standard. Suitably plating such a powder with silver produces a tamping powder of a type particularly advantageous for the purposes of the invention. Assuming the method of immersion coating by chemical displacement to be used, the coating operation may desirably be carried out in a tumbling barrel of conventional type, in which the plating or coating solution and the copper powder are placed, the barrel being rotated to agitate the contents and thoroughly expose all surfaces of the copper particles to the plating solution.

The amount of silver plated out upon the copper powder will naturally depend, in any given instance, upon the plating bath composition and how long the powder remains immersed therein, as well as upon other operating factors, thus enabling rather accurate control and regulation of the thickness of the deposited coating, as desired.

By way of concrete illustrative example, let it be assumed that it is desired to prepare a silver coated or plated copper powder, of which the silver coating shall be 1.5 to 2.0 per cent by weight. The coating bath may be made up by dissolving silver cyanide and sodium cyanide in water in the proportion of 4 ounces of silver cyanide and 6 ounces of sodium cyanide per gallon of water. The solution may also desirably contain a small quantity of a wetting agent, of which many different specific kinds are commercially available and suitable. For example, a wetting agent supplied by Palo-Myers Inc. of New York city under the designation "7027-C," employed in the proportion of about 0.5 gram per gallon of plating solution, gives satisfactory results. Employing 5 gallons of this solution in the tumbling barrel procedure mentioned and operating at ordinary room temperature, 50 pounds of spongy copper (e. g. the MD8841 grade) can be provided with a 1.5 to 2 per cent coating of silver in the course of a few minutes, typically about 3 minutes. The silver-coated copper should be thoroughly rinsed with cool water to free it of basic cyanide salts. After removing adherent water mechanically, as by squeezing the powder in a cloth bag, most of the remaining moisture may be eliminated by washing several times with methanol, using reclaimed methanol for the first washings and, finally, new methanol. The drying may be completed in a steam dryer under infra-red lamps, the powder being spread out in a shallow layer. When thoroughly dry, the powder is allowed to cool slowly in the dryer while being worked occasionally with a brush. The dried powder is then passed through a No. 28 sieve on a vibrator and screen directly from the dryer into a container, a desiccant is placed in the container, and the container is then tightly closed.

This silver-plated copper powder is extremely well adapted for producing the tamped brush connection of the invention. By varying the time of immersion, or the quantity or concentration of the coating solution, or any two or more of these factors, the amount of silver plated upon the copper powder may be less or greater than in the typical instance just described. In any given case, depletion of the silver content of the bath to the practical operative minimum sets the upper limit, of course, for increasing thickness without bath replenishment.

Instead of the particular variety or grade of copper powder employed in the foregoing specific example, any other reasonably finely granular or powdered form of copper may be employed within the broad scope of the invention, although not always with such complete realization of its benefits. So also, plating or coating of the copper powder with silver may be accomplished otherwise than by the immersion method described, although that method affords the practical advantages of simplicity and dependability.

Similarly, plating or coating of the copper powder with any of the other hereinbefore mentioned metals of lower electrical conductivity than silver, where use of such other metals in place of silver may for any reason be deemed desirable, can be effected by the same general method already described for silver, or otherwise.

Figure 2:
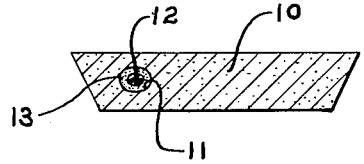

In utilizing any of the herein described metal-coated copper tamping powders to produce the present novel tamped connection of an electrical lead to a carbon brush or other carbon block, the manufacturing operation employed may be the same in general as when utilizing tamping powders of the type heretofore known. Also the general appearance of the complete, finished article is the same. One such finished article within the scope of the invention is illustrated in the accompanying drawings, wherein Fig. 1 is a side elevation, partly broken away and in vertical section, of a carbon brush provided with the novel connection; and Fig. 2 is a transverse section on the line 2—2 of Fig. 1.

Referring to the drawings, the carbon block 10 is provided with a hole 11 formed therein, of a diameter somewhat larger than that of the end portion of stranded copper wire cable or flexible pigtail lead 12, centrally positioned within said hole. Surrounding the inserted end portion of the cable and tightly filling the space between it and the wall of the hole is the hereindescribed copper powder coated with a second metal, most advantageously silver, consolidated under pressure by tamping in the conventional manner to form a compacted sleeve-like body 13 which anchors the cable within the carbon block. Most desirably the outer end of the tamped metal-coated copper powder sleeve is protected by a layer 14 of suitably heat-resistant plastic sealant, such as a high-melting resin or wax, that will function protectively at temperatures up to at least 200° C. Such sealant may be applied, following the tamping operation, in the form of a solution or as a powdered solid. For example, a few drops of a solution of a thermosetting phenol-formaldehyde resin may be placed on the tamped connection. This not only aids in protecting the connection from oxidation but increases its pulling out strength. Particularly good results are obtained if the sealant used is a thermosetting glyptal resin applied in the form of a commercially available varnish such, for example, as one of the General Electric Company products known as #1202 red glyptal varnish or #1696 clear varnish.

While not an indispensable feature of the invention, it has been found distinctly advantageous to employ for the flexible conductor in the novel connection combination what is known as oxygen-free high conductivity ("OFHC") copper cable, because it oxidizes less quickly than ordinary copper cable does under the same conditions and thus will stand a higher current overload without increasing the connection resistance.

In order to increase the pulling out strength of the connection, the inner end of the hole 11 may be flared out, if desired, and the end of the copper cable correspondingly upset or splayed out, so that when the metal-coated copper powder is tamped into place, the cable is still more solidly locked into the hole. Or, the wall of the hole may be grooved or threaded to produce a similar locking effect. In and of itself, each of these expedients is old in the art and is therefore not illustrated in the drawings, but use thereof in the present novel combination is often of substantial practical advantage.

In actual use, brushes embodying the novel connection herein disclosed show markedly superior performance, especially in respect to standing up well under vibration and high current loads. The pulling out strength of the shunts or pig-tails is also high and remains so after long continued severe service. This is strikingly shown by the data given below resulting from comparative tests, under identical test conditions, of typical brushes having the silver-coated copper tamped connections of the invention, on the one hand, and typical brushes of the prior art provided with copper amalgam tamped connections, on the other. In all cases, the new brushes and the prior art brushes compared were identical in all respects except for the difference in the composition of the tamping powder; the pigtails being of 7-37-.005 stranded copper cable, the receiving hole in the carbon brush being ¾ inch deep, a semi-automatic tamping machine with strandard stems and tamping block being employed to form the tamped connection, and the connection being sealed with glyptal varnish.

*I. Continuous constant current load and chatter test—Traction motor brushes*

In this test, the effect of high current and vibration on traction motor brushes is simultaneously determined. For each type of brush connection, a set or string of 8 brushes, electrically connected in series, is run on a stepped wheel simulating a commutator and having four steps, each 0.050 inch high, equally spaced. The stepped wheel is rotated at 1100 R. P. M. resulting in 4400 vibrations per minute for each brush. In each case, throughout the continuous run for the period indicated, the current load was maintained constant at 55 amps. D. C., supplied through suitable connections to the end terminals of the series-connected brushes of each set.

Silver-coated copper tamped connection:
  Duration of test, 41¾ hours run—11,013,000 vibrations.
  Temperature at start: Brush #1—298° F., #2—305° F.
  Temperature at end: Brush #1—298° F., #2—270° F.
  Connection resistance, ohms.

| Brush | Before Test | After Test |
|---|---|---|
| #1 | .00018 | .00145 |
| #2 | .00013 | .00155 |
| #3 | .00011 | .00047 |
| #4 | .00012 | .00064 |
| #5 | .00011 | .00063 |
| #6 | .00014 | .00065 |
| #7 | .00007 | .00041 |
| #8 | .00009 | .00067 |
| Average | .000118 | .00081 |

Copper amalgam tamped connection:
  Duration of test, 42 hours run—11,088,000 vibrations.
  Temperature at start: Brush #1—299° F., #2—298° F.
  Temperature at end: Brush #1—350° F., #2—372° F.
  Connection resistance in ohms.

| Brush | Before Test | After Test |
|---|---|---|
| #1 | .000185 | .0136 |
| #2 | .00016 | .035 |
| #3 | .00028 | .0146 |
| #4 | .00022 | .102 |
| #5 | .00016 | .0225 |
| #6 | .00018 | .0104 |
| #7 | .00015 | .0120 |
| #8 | .00014 | .0540 |
| Average | .000185 | .033 |

COMPARISON OF TEST RESULTS

The cable of the copper-amalgam connection was quite badly oxidized and embrittled; that of the silver-coated copper connection showed the effect of heat but was virtually unaffected. The final resistances indicate the relative worth of the two kinds of connections, the resistance of the amalgam type increasing to 0.033 average, or more than 150 times the average at the start; while that of the silver-coated copper type, after this severe test, was still only 0.00081, or less than 7 times the average at the start.

*II. Intermittent variable current load test—automotive brushes*

This "cycle test" is to determine the effect on the shunt resistance of automotive brushes under the variable service conditions indicated, as well as the effect on the shunt pulling out strength. In each set or string of brushes compared, the 12 brushes of each set are connected in series so that the specified current (D. C.) can be passed through all brushes of the set. The individual brushes are tested for shunt resistance before and after each load as explained below. In the tables, the letters at the head of the columns indicate the following treatment in successive stages of the test:

A—Original resistance of brushes.
B—Resistance after passing 20 amps. at 2.0 volts through brushes for 4½ hours.
C—Resistance after passing 25 amps. at 2.4 volts for 2¼ hours.
D—Cooled to 20–30° F. for 23 hours.
E—Cooled again for 63 hours. Then 35 amps. at 4.0 volts passed through brushes for 2 hours 10 minutes.
F—Cooled again for 17 hours.
G—Resistance after passing 40 amps. at 4.4 to 4.6 volts for 1 hour 20 minutes.
H—Resistance after passing 40 amps. at 4.4 to 4.6 volts for 5 hours.

SILVER-COATED COPPER TAMPED CONNECTION

| Brush | Shunt Resistance (ohms) | | | | | | | |
|---|---|---|---|---|---|---|---|---|
| | A | B | C | D | E | F | G | H |
| 1C2 | .00038 | .00037 | .00038 | .00039 | .00041 | .00041 | .00043 | .00047 |
| 2C2 | .00033 | .00034 | .00035 | .00036 | .00041 | .00041 | .00045 | .00052 |
| 3C2 | .00038 | .00038 | .00038 | .00039 | .00041 | .00041 | .00043 | .00055 |
| 4C2 | .00039 | .00038 | .00038 | .00038 | .00039 | .00040 | .00040 | .00044 |
| 5C2 | .00040 | .00039 | .00039 | .00040 | .00040 | .00040 | .00040 | .00040 |
| 6C2 | .00037 | .00037 | .00037 | .00038 | .00047 | .00047 | .00051 | .00064 |
| 7C2 | .00024 | .00024 | .00024 | .00025 | .00028 | .00029 | .00030 | .00034 |
| 8C2 | .00041 | .00040 | .00041 | .00041 | .00043 | .00043 | .00044 | .00048 |
| 9C2 | .00026 | .00025 | .00026 | .00026 | .00031 | .00032 | .00032 | .00037 |
| 10C2 | .00036 | .00037 | .00037 | .00036 | .00036 | .00036 | .00036 | .00042 |
| 11C2 | .00023 | .00023 | .00024 | .00025 | .00028 | .00030 | .00033 | .00044 |
| 12C2 | .00039 | .00041 | .00050 | .00055 | .00081 | .00082 | .00093 | .00115 |
| Average | .00034 | | | | | | .00044 | .00052 |

NOTE.—The total resistance of the string of brushes increased from .081 at A to .094 at the conclusion of H, or about 16 per cent.

SHUNT PULLING STRENGTH

| Before Cycle Test | | After Cycle Test | |
|---|---|---|---|
| Brush | Cable pulled out at (lbs.) | Brush | Cable not pulled out but broke at (lbs.) |
| 13C2 | 64 | 1C2 | 65 |
| 14C2 | 68 | 3C2 | 77 |
| 15C2 | 61 | 7C2 | 65 |
| 16C2 | 64 | 9C2 | 76 |
| 17C2 | 69 | 11C2 | 67 |
| Average | 65 | Average | 70 |

COPPER AMALGAM TAMPED CONNECTION

| Brush | Shunt Resistance (ohms) | | | | | | |
|---|---|---|---|---|---|---|---|
| | A | B | C | D | E | F | G |
| 1A | .00026 | .00027 | .00035 | .00033 | .00048 | .00050 | .00225 |
| 2A | .00026 | .00029 | .00032 | .00034 | .00084 | .00096 | .00245 |
| 3A | .00029 | .00031 | .00037 | .00037 | .00057 | .00056 | .00380 |
| 4A | .00031 | .00035 | .00045 | .00043 | .0025 | .0025 | .00470 |
| 5A | .00025 | .00029 | .00037 | .00040 | .00076 | .00075 | .00145 |
| 6A | .00022 | .00023 | .00032 | .00032 | .00064 | .00067 | .00115 |
| 7A | .00031 | .00033 | .00038 | .00034 | .0080 | .0088 | .0162 |
| 8A | .00033 | .00029 | .00039 | .00041 | .00195 | .00170 | .0029 |
| 9A | .00027 | .00028 | .00034 | .00033 | .00140 | .00160 | .0034 |
| 10A | .00028 | .00029 | .00041 | .00044 | .00140 | .00170 | .00475 |
| 11A | .00037 | .00037 | .00089 | .00093 | .0049 | .0051 | .0034 |
| 12A | .00024 | .00028 | .00039 | .00040 | .00081 | .00084 | .00385 |
| Average | .00028 | | | | | | .00502 |

NOTE.—The total resistance of the string of brushes increased from .073 ohm at A to .14 at the conclusion of G, or nearly 100 per cent. The test was not carried beyond G because the connections had become so oxidized and the amalgam slugs had in all instances shrunk so much that it was useless to attempt the test for pulling strength of the connections.

COMPARISON OF TEST RESULTS

The superiority of the silver-coated copper connections over the copper amalgam connections is evident from the foregoing test results. In the case of the former, the average increase in individual connection resistance through treatment G of the sequence was about 30 per cent, and through H is about 47 per cent; whereas, in the case of the copper amalgam connections, which were not tested beyond G, the average increase was 1700 per cent. It is also noteworthy that the shunt pulling strength of the silver-coated copper tamped connections actually increased, so that even after treatment H, all the cables broke without being pulled out.

What is claimed is:

1. In combination, a carbon block having a cavity formed therein, and an electrical conductor having an end portion disposed within said cavity and secured to the block by a coherent mass of discrete metallic particles tightly compacted into said cavity around said conductor, each particle consisting of a copper core protectively coated with another metal, such coating metal constituting not more than about 5 per cent by weight of the compacted mass.

2. The combination defined in claim 1, wherein said coating metal is selected from the group consisting of silver, tin, cadmium, lead and nickel.

3. The combination defined in claim 1, wherein said coating metal is silver.

4. In combination, a carbon block having a cavity formed therein, and an electrical conductor having an end portion disposed in said cavity and secured to the block by a tamped metal powder connection consisting of copper particles having a relatively small proportion of silver associated therewith as an adherent coating only.

5. In combination, a carbon brush having a cavity therein, a stranded copper cable having a portion disposed in said cavity, and a body of silver-coated copper powder compacted between said portion of the cable and the cavity wall to provide a mechanical and electrical connection between them.

6. The combination defined in claim 5, wherein the silver content of said coated powder does not substantially exceed 5 per cent by weight.

7. The combination defined in claim 6, which further includes a layer of heat resistant sealing material protecting said body of compacted powder from exposure to atmosphere.

8. The combination defined in claim 7, wherein sliver-coated spongy copper powder is employed having a silver content within the approximate range of from 0.1 per cent to 3.0 per cent.

9. The combination defined in claim 8, wherein the silver content of the coated powder is from about 1.5 per cent to 2 per cent.

10. The combination defined in claim 5, wherein said stranded cable is composed of oxygen-free high-conductivity copper.

11. The combination defined in claim 6, wherein said stranded cable is composed of oxygen-free high-conductivity copper.

12. The combination defined in claim 7, wherein said stranded cable is composed of oxygen-free high-conductivity copper.

13. The combination defined in claim 8, wherein said stranded cable is composed of oxygen-free high-conductivity copper.

14. The combination defined in claim 9, wherein said stranded cable is composed of oxygen-free high conductivity copper.

JOHN B. FALCETTONI.

(References on following page)

REFERENCES CITED

The following references are of record in the file of this patent:

UNITED STATES PATENTS

| Number | Name | Date |
|---|---|---|
| 904,077 | McCourt | Nov. 17, 1908 |
| 1,425,632 | Click | Aug. 15, 1922 |
| 1,453,793 | Hamister | May 1, 1923 |
| 1,986,197 | Harshaw | Jan. 1, 1935 |

FOREIGN PATENTS

| Number | Country | Date |
|---|---|---|
| 392,067 | Great Britain | May 11, 1933 |
| 791,830 | France | Oct. 7, 1935 |